US010331654B2

(12) United States Patent
Goldman et al.

(10) Patent No.: US 10,331,654 B2
(45) Date of Patent: *Jun. 25, 2019

(54) USING AN ACTION REGISTRY TO EDIT DATA ACROSS USERS AND DEVICES

(71) Applicant: Adobe Inc., San Jose, CA (US)

(72) Inventors: Oliver I. Goldman, Seattle, WA (US); Eric P. Snowden, San Francisco, CA (US); Eric A. George, Redmond, WA (US); Abraham M. Muchnick, Woodmere, NY (US); Julian R. Wixson, Portland, OR (US)

(73) Assignee: Adobe Inc., San Jose, CA (US)

( * ) Notice: Subject to any disclaimer, the term of this patent is extended or adjusted under 35 U.S.C. 154(b) by 226 days.

This patent is subject to a terminal disclaimer.

(21) Appl. No.: 15/160,970

(22) Filed: May 20, 2016

(65) Prior Publication Data

US 2017/0337234 A1    Nov. 23, 2017

(51) Int. Cl.
| G06F 17/30 | (2006.01) |
| G06F 16/23 | (2019.01) |
| G06F 3/0484 | (2013.01) |
| H04L 29/06 | (2006.01) |
| H04L 29/08 | (2006.01) |
| G06F 21/10 | (2013.01) |
| G06F 21/62 | (2013.01) |

(52) U.S. Cl.
CPC .......... *G06F 16/235* (2019.01); *G06F 3/0484* (2013.01); *G06F 16/2393* (2019.01); *G06F 21/10* (2013.01); *G06F 21/6218* (2013.01); *H04L 63/101* (2013.01); *H04L 67/1097* (2013.01); *G06F 2221/2147* (2013.01); *H04L 63/104* (2013.01)

(58) Field of Classification Search
USPC .......................................... 707/722; 715/735
See application file for complete search history.

(56) References Cited

U.S. PATENT DOCUMENTS 9,310,981 B2 * 4/2016 Lynch ................. G06F 9/44505
2013/0326377 A1 12/2013 Yu et al.
(Continued)

OTHER PUBLICATIONS

"Combined Search and Examination Report", GB Application No. 1704538.6, dated Aug. 11, 2017, 6 pages.
(Continued)

*Primary Examiner* — Hung T Vy
(74) *Attorney, Agent, or Firm* — SBMC

(57) ABSTRACT

Using an action registry to edit data across users and devices is described. In one or more implementations, a user editing data in an application requests to share the data with another user or another device for further editing. Responsive simply to the request or based on an exchange of content transfer information, the data is communicated to the selected user or device. Using information maintained by an action registry, a list of applications capable of editing the data is presented to the selected user or via the selected device. Upon selection of an application from the list, the selected application is launched. Once changes are made to the data by the selected user or device, those changes can be saved and the changed data automatically returned to the original user and/or device. The changed data can then be automatically presented to the original user or on the original device.

20 Claims, 10 Drawing Sheets

(56) References Cited

U.S. PATENT DOCUMENTS

2014/0229839 A1* 8/2014 Lynch ................. G06F 9/44505
　　　　　　　　　　　　　　　　　　　　　　　715/736
2016/0104016 A1* 4/2016 Deal ................... G06K 7/0004
　　　　　　　　　　　　　　　　　　　　　　　235/462.15
2016/0306996 A1* 10/2016 Kulkarni ............... G06Q 10/10
2017/0336924 A1　11/2017 Muchnick et al.

OTHER PUBLICATIONS

"Non-Final Office Action", U.S. Appl. No. 15/160,938, dated Jun. 27, 2018, 13 pages.
"Final Office Action", U.S. Appl. No. 15/160,938, dated Oct. 17, 2018, 20 pages.
"Non-Final Office Action", U.S. Appl. No. 15/160,938, dated Feb. 25, 2019, 12 pages.

* cited by examiner

USING AN ACTION REGISTRY TO EDIT DATA ACROSS USERS AND DEVICES

BACKGROUND

Advances in computing technology have made a vast array of functionality available to users. Evidence of this can be found by browsing the multitude of applications currently available for different devices. It can also be found in the continued development and release of new and different applications. With regard to modifying a particular type of content, for instance, there may be many options from which a user can choose. Consider applications that allow users to modify images. In terms of functionality, image-editing applications can range from social-media based applications that allow users to perform a limited number of image editing operations (e.g., cropping, application of a number of predefined filters, and so forth) to professional-grade image editing applications that provide users with a robust suite of tools allowing them to tweak images in a seemingly endless number of ways.

With the number and variety of applications available, it should be appreciated that some applications allow users to modify a type of content in some ways while others allow users to modify the type in different ways. Additionally, some devices may be better suited for different portions of the content creation process than others. For example, a user may capture an image using a mobile phone. However, some image modification actions may be difficult to perform on mobiles phones due to limited screen size. In these cases, a tablet device or desktop may be more suitable. Similarly, users may wish to collaborate with other users to edit content, such as with users who have superior editing skills for a portion of the content creation process.

Conventional techniques for editing content across devices and with other users may be cumbersome. In particular, conventional techniques may involve saving changes made to a content item at a first device or by a first user, and then sending the changes to a second device or second user for further modification. The content may then be opened on the second device or by the second user with a second application, e.g., to further modify the content with this second application. Once changes are made at the second device or by the second user, the content can then again be saved and sent back to the first device or the first user. The modified content can again be opened at the first device or by the first user to provide even further edits to the content. However, this process can be tedious and, as a result, may cause users to simply forgo modifying their content using different devices or in collaboration with other users. Consequently, conventional techniques hamper the ability of users to modify content.

SUMMARY

Using an action registry to edit data across users and devices is described. In one or more implementations, a user editing data in an application requests to share the data with another user or with another device for further editing. Responsive simply to the request or based on an exchange of content transfer information, the data is communicated to the selected user or device. Along with this, a query is generated that requests applications from an action registry that are capable of editing the data. The action registry maintains information indicating the types of data different applications are capable of editing. For example, the action registry maintains information that indicates applications capable of performing actions (e.g., cropping, filtering, blurring, etc.) on images. With the maintained information, the action registry can determine which applications registered therewith are capable of performing actions on the type of data. At least some of these applications are included in a query answer from the action registry.

The answer is usable to present a list of applications that are capable of editing the data to the selected user or via the selected device. In addition to application names, the list can indicate the types of actions the applications are capable of performing on the type of data. Upon selection of an application from the list, the selected application is launched. In particular, the selected application is launched in a manner that supports further editing of the data by the selected user or on the selected device. For instance, the data is presented in an editing interface of the launched application. In one or more implementations, the selection selects the application for performing a specific action on the data. In such cases, launching the application includes causing the data to be presented in a particular interface of the application which supports that action. Once changes are made to the data by the selected user or device, those changes can be saved and the changed data automatically returned to the original user and/or device. Responsive to doing so, the changed data is automatically presented to the original user or on the original device for continued editing using the original application.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
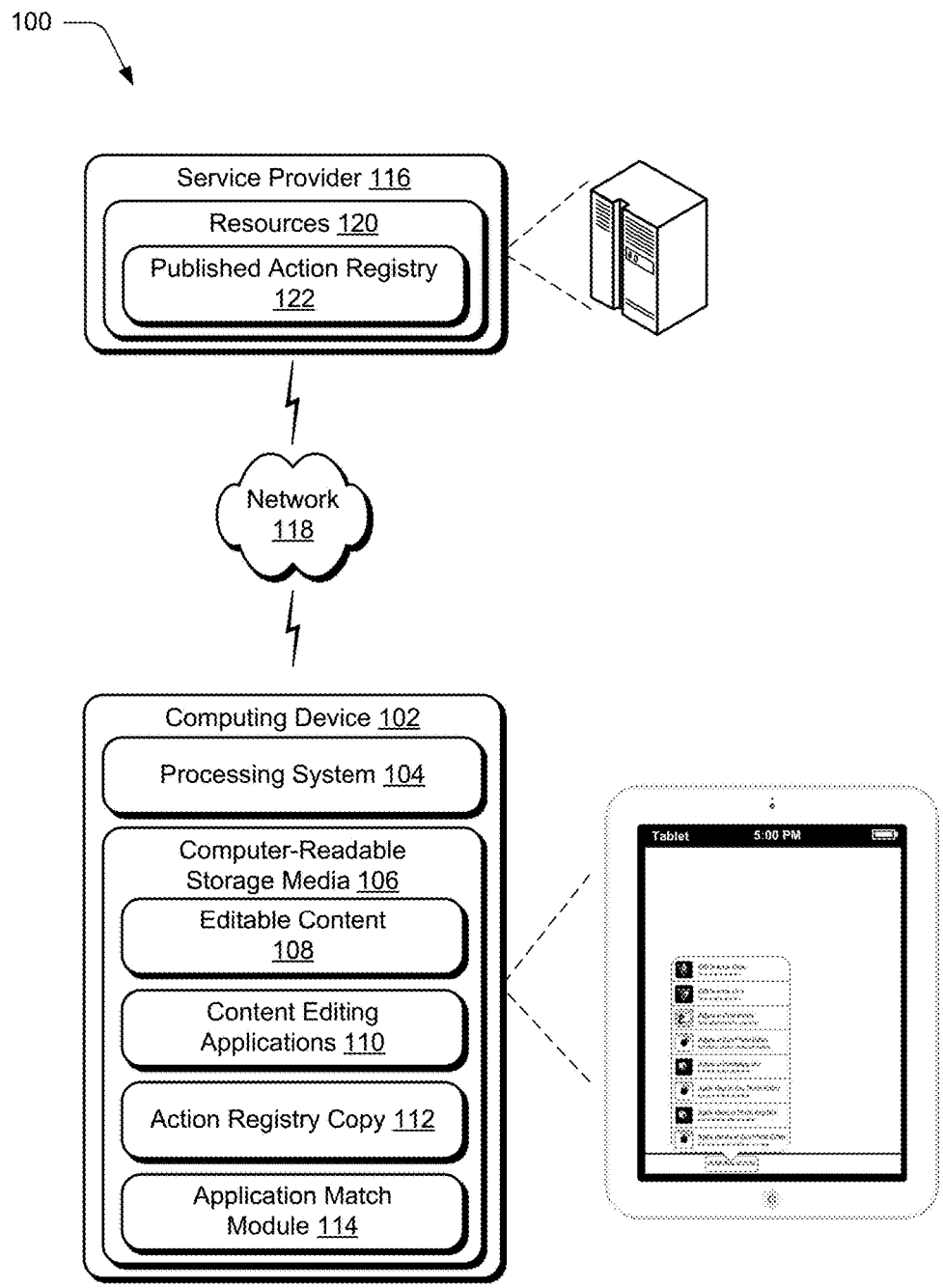
FIG. 1 is an illustration of a digital environment in an example implementation that is operable to employ techniques described herein.

Conventional techniques for using different applications to modify an item of content can involve modifying the item with a first application, saving the item to a storage location (or otherwise causing the item to be placed in a location, such as a clipboard, that is accessible to the different applications), manually launching a second application, and further modifying the item with the second application. This process can be tedious and time consuming, however. As a result, users may simply forgo making modifications to their content, thereby stifling content creation efforts.

Using an action registry to edit data across users and devices is described. As used herein an "action registry" refers to a repository that maintains lists of applications capable of performing some action or actions on data of a given type. For example, the action registry may include information about applications that are capable of editing an image in some way. The action registry is capable of generating lists of these applications and returning them to requesting applications and devices. With access to the action registry, a user editing data in a first application is able to select an option to see other applications that are available for editing the data. Within the first application, the user can be presented with an indication of the other applications that are capable of editing the data, and may select one of those other applications. Unlike conventional techniques, however, the other applications can be determined and presented without the first application having a priori knowledge of those other applications. In response to selection of a second application, the second application can be launched and the data can be presented in an interface of the second application. In particular, the data is presented to allow the user to modify the data using the functionality of the second application.

When the user finishes modifying the data with the second application, the second application can be closed and the user returned to the first application, where the data includes the changes made with the second application. In this way, the transition between different applications to modify data is made seamless. The inconvenience of having to manually save modifications made to the data in a first application, manually open a second application to make further modifications to the data, save the data again, and reopen the data with the first application, is removed. Further, by presenting lists of applications that are capable of performing operations on a certain type of data, a user may learn that applications have certain functionality of which he or she was unaware. The user may also learn how applications can be used in an integrated fashion of which he or she was unaware. In some instances, a user may be presented with applications that are capable of performing some action on the certain type of data that the user has not yet downloaded or installed.

The types of actions applications are capable of performing on data is maintained in the action registry. For example, an application can register with the action registry and may indicate each type of data the application is capable of modifying. For each type of data, the actions the application is capable of performing on the type of data are also indicated. Consider an example in which an image editing application registers with the action registry. As part of doing so, information may be provided to the action registry that indicates the types of images the image editing application is capable of modifying, e.g., that it is capable of modifying JPEG and BMP images. Information is also provided that indicates the types of actions the image editing application is capable of performing on the indicated types, e.g., cropping, applying filters to, and scaling JPEG images, but cropping and applying text to BMP images. The action registry allows a first application to present other applications capable of editing a same type of data without the first application having a priori knowledge of those other applications.

Regardless of the actions an application is capable of performing on a data type, information indicative of these actions is maintained by the action registry. Using this information, indications of applications capable of performing actions on a given data type can be generated. These indications can be used to enable efficient modification of a content item with different applications, across different devices associated with a user, and between different users. Thus through the action registry, users can modify data using multiple, different applications more easily than using conventional techniques.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes a computing device 102 having a processing system 104 that includes one or more processing devices (e.g., processors) and one or more computer-readable storage media 106. The illustrated environment 100 also includes editable content 108, content editing applications 110, action registry copy 112, and application match module 114, which are embodied on the computer-readable storage media 106 and operable via the processing system 104 to implement corresponding functionality described herein. In at least some implementations, the computing device 102 includes functionality to access various kinds of web-based resources (content and services), interact with online providers, and so forth as described in further detail below.

The computing device 102 is configurable as any suitable type of computing device. For example, the computing device 102 may be configured as a server, a desktop computer, a laptop computer, a mobile device (e.g., assuming a handheld configuration such as a tablet or mobile phone), a tablet, a device configured to receive gesture input, a device configured to receive three-dimensional (3D) gestures as input, a device configured to receive speech input, a device configured to receive stylus-based input, a device configured to receive a combination of those inputs, and so forth. Thus, the computing device 102 may range from full resource devices with substantial memory and processor resources (e.g., servers, personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 10.

The environment 100 further depicts one or more service providers 116, configured to communicate with computing device 102 over a network 118, such as the Internet, to provide a "cloud-based" computing environment. Generally speaking, service providers 116 are configured to make various resources 120 available over the network 118 to clients. The illustrated environment 100 also includes published action registry 122, which is included in the resources 120 provided by the service provider 116. The published action registry 122 is used to implement application matching for editing data. Other service providers 116 may leverage the published action registry 122 of one of the service providers, and thus not include a respective copy of the action registry.

With regard to some of the resources 120 that the service providers 116 can generally make available to clients, users can sign up for accounts that are employed to access corresponding resources from a provider. The provider authenticates credentials of a user (e.g., username and password) before granting access to an account and corresponding resources 120. Other resources 120 are made freely available, (e.g., without authentication or account-based access). The resources 120 can include any suitable combination of services and/or content typically made available over a network by one or more providers. Some examples of services include, but are not limited to, content modification and creation services (e.g., Adobe® Creative Cloud), image storage and/or sharing services (e.g., Flickr®), social network services (e.g., Facebook®, Twitter®, Instagram®, Hyperlapse®, and the like), search engine services capable of returning images as search results, and so forth.

Content editing applications 110 can create and edit significant amounts of editable data. Editable content 108 represents the data that is maintained at or accessible to the computing device 102 for editing by the content editing applications 110. Service providers 116 (e.g., "cloud storage" service providers and the like) may also maintain some of the data that is editable by the content editing applications 110 of the computing device 102. Regardless of where the editable content 108 is maintained, it can be formatted in any of a variety of different digital formats. Examples of different types of editable content 108 include but are not limited to images, videos, audio content, web documents, word processing documents, spreadsheets, code projects, and so on. With regard to the variety of different digital formats, for example, when the editable content 108 corresponds to an image or includes an image, the image can be formatted in formats including but not limited to JPEG, TIFF, RAW, GIF, BMP, PNG, and so on. Other types of the editable content 108 may also be formatted in a variety of different digital formats, including proprietary digital formats usable by a single application or suite of content editing applications 110 from a specific software provider.

The action registry copy 112, the application match module 114, and the published action registry 122 represent functionality to implement techniques using an action registry to edit data across users and devices as described herein. In conjunction with editing data (e.g., an item of the editable content 108), the application match module 114 may present a user of the computing device 102 with an option to be shown applications that are capable of performing actions on the data being edited. If the data being edited is an image, for instance, the application match module 114 may present an option that is selectable to show a list of applications capable of performing actions on images.

To generate a list of these applications, the application match module 114 uses at least one of the action registry copy 112 or the published action registry 122. These include information that indicates applications capable of performing some action on the particular type of data. The applications may correspond to the content editing applications 110 that are local to the computing device 102 (e.g., have already been downloaded and installed on the computing device 102), as well as applications that have not yet been downloaded or otherwise installed on the computing device 102 (e.g., such as applications available to the computing device 102 through an application marketplace). The action registry copy 112 and the published action registry 122 also indicate the particular actions that an application is capable of performing on the particular type of data. In one or more implementations, the action registry copy 112 corresponds to a copy of the published action registry 122. The published action registry 122 may be updated with input from software providers about their applications, the types of data their applications act on, and the specific actions those applications perform. These updates may be pushed to the action registry copy 112 when the computing device 102 is communicably connected to the service provider 116, e.g., the published action registry 122 (or just changes made thereto) may be copied to the action registry copy 112 as part of an update procedure. In this way, the action registry copy 112 may be used to implement the techniques described herein when the computing device 102 is offline, e.g., not communicably connected to the service provider 116. Alternately or in addition, the action registry copy 112 enables application matching to be performed without having to reference the published action registry 122 from the service provider 116 for each matching.

Consider again the example in which the particular type of data being edited is an image. The action registry copy 112 and the published action registry 122 include information that indicates applications capable of performing some action on an image. For each of these applications, the action registry copy 112 and the published action registry 122 also include information indicative of the particular action or actions an application is capable of performing. For instance, if a first application is capable of filtering images, blurring images, and cropping images, the action registry copy 112 and the published action registry 122 indicate these capabilities. Similarly, if a second application is capable of just cropping and resizing images, then these capabilities are indicated for the second application.

Given a type of data being edited, the application match module 114 can thus utilize the information maintained by at least one of the action registry copy 112 or the published action registry 122 to ascertain applications capable of performing actions on the data type. As mentioned above, the application match module 114 can present a list of applications capable of acting on a particular data type to a user editing the particular type. The user may select one of the applications from the presented list to further edit the particular type of data using the selected application. An application from which a user selects another application to further edit content may be referred to herein as a "primary" application. An application selected from a primary application for the further editing may be referred to herein as a "secondary" application When a user selects one of the listed applications to further edit the data, the techniques described herein present the data to the user via the selected, secondary application. The user can then edit the data using the secondary application. When the user is done editing the data using the secondary application, the user can select an option to save the data and return to the primary application, where the user may continue editing the data using the primary application. It should be noted that when the user returns to the primary application the data being edited includes the edits made in the secondary application.

To present the data for editing in the secondary application and enable return of the data to the primary application with the changes made in the secondary application, the primary and secondary applications exchange messages that are configured as described herein below. In one or more implementations, each of the primary and secondary applications are configured with the application match module 114, and the messages are exchanged between the applications by those modules. The messages enable the data being edited to be presented in different applications in a manner that preserves changes made by the user. The exchange of these messages between applications also eliminates the need for a user to search for and open different applications to edit the data. In one or more implementations, the application match module 114, the action registry copy 112, and the published action registry 122 enable data to be seamlessly edited in different applications across different devices as well as by different users.

In one or more implementations, the application match module 114 is implementable as a software module, a hardware device, or using a combination of software, hardware, firmware, fixed logic circuitry, etc. Further, the application match module 114 can be implementable as a stand-alone component of the computing device 102 as illustrated. In addition or alternatively, the application match module 114 can be configured as a component of a web service, one of the content editing applications 110, an operating system of the computing device 102, a plug-in module, or other device application as further described in relation to FIG. 10.

Having considered an example environment, consider now a discussion of some example details of the techniques for using an action registry to edit data across users and devices in accordance with one or more implementations.

Using an Action Registry to Edit Data Across Users and Devices

This section describes some example details of techniques for using an action registry to edit data across users and devices in accordance with one or more implementations. The discussion refers to FIGS. 2-5, which depict example user interfaces and data structures that represent features pertinent to the functionality described herein.

Figure 2:
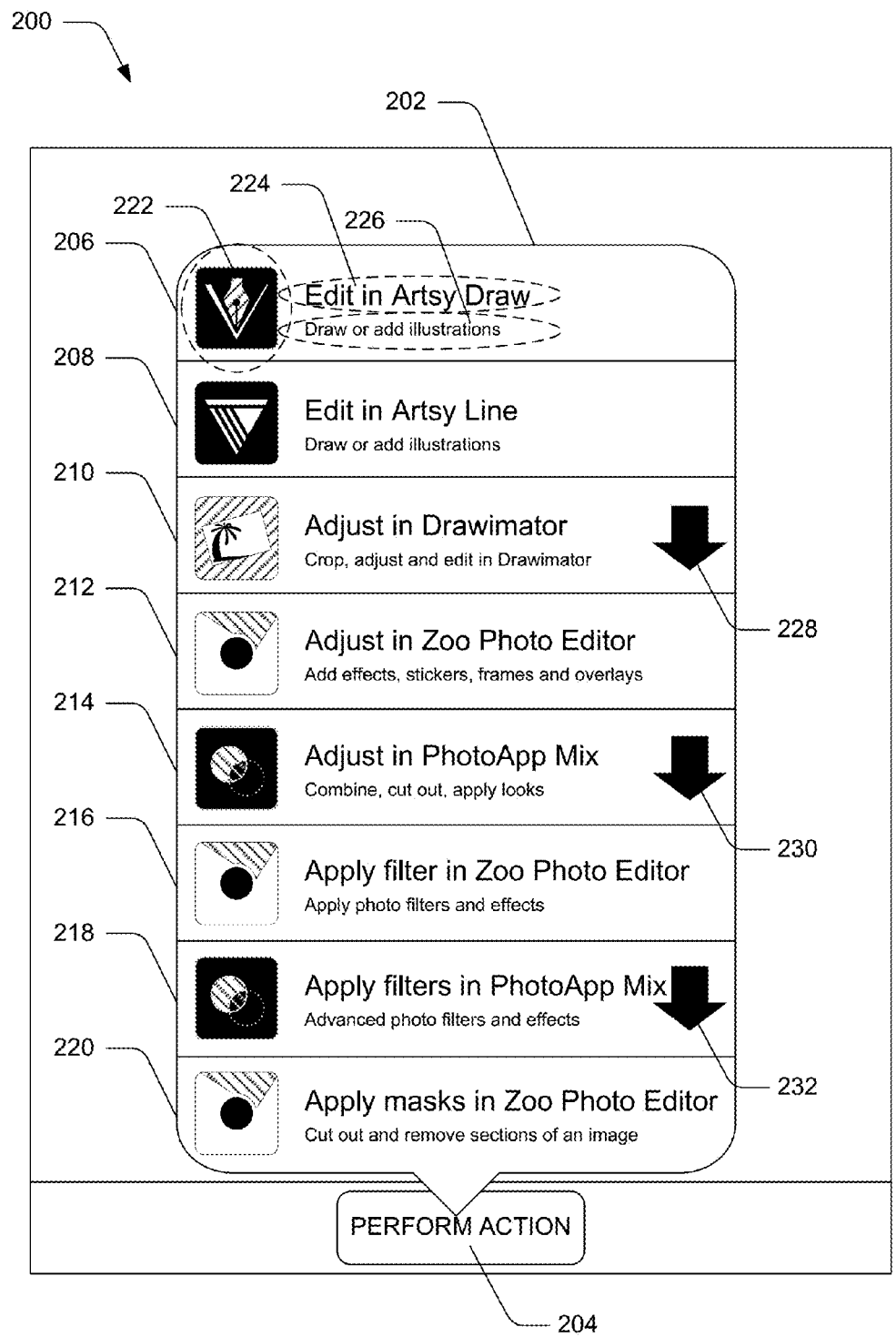
FIG. 2 is an example implementation depicting a user interface that includes selectable indications of applications matched for editing data using an action registry.

FIG. 2 depicts an example implementation, generally at 200, of a user interface from which applications matched for editing data using an action registry can be selected. In particular, FIG. 2 depicts popup menu 202 and application request component 204. The popup menu 202 may be displayed to a user of the computing device 102 responsive to selection of the application request component 204, e.g., a touch selection of the application request component 204. The application request component 204 can be presented to a user via an interface of an application, such as a primary application the user is using to edit data. Although the application request component 204 is depicted as a button, it should be appreciated that the application request component 204 may be configured in a variety of different ways without departing from the spirit or scope of the techniques described herein.

In general, the application request component 204 represents part of a user interface that enables a user to request to be shown other applications that are capable of performing actions on data currently being edited. Thus, the application request component 204 may be configured as a button as shown, as a menu item, an ability to recognize typed or voice commands (e.g., a typed or spoken command such as "Computer, show me other applications for editing this data"), an ability to recognize a particular keyboard shortcut, an ability to recognize a particular gesture, and so on.

In any case, responsive to a user selection or user input to the application request component 204, the popup menu 202 can be displayed. The popup menu 202 represents functionality to list applications that are capable of performing actions on data being edited. By way of example, the popup menu 202 may be displayed in a current application used to edit the data, e.g., a primary application. The popup menu 202 lists other applications that are capable of editing the data that is being edited with the primary application.

The popup menu 202 also represents functionality to indicate the actions that an application is capable of performing on the data being edited. In the illustrated example, the popup menu 202 includes application indications 206, 208, 210, 212, 214, 216, 218, 220. Each of the application indications 206, 208, 210, 212, 214, 216, 218, 220 is depicted with an application icon, a broad description that includes the indicated application's name and a short indication of the application's capabilities, and a more detailed description of the actions the application is capable of performing on the content under consideration. With particular reference to the application indication 206, it includes application icon 222, broad description 224, and more detailed description 226. The broad description 224 includes the indicated application's name, e.g., 'Artsy Draw', and a short indication of the application's capabilities, e.g., 'Edit'. The more detailed description 226 describes the actions the indicated application is capable of performing, e.g., 'Draw or add illustrations'.

It should be appreciated that application indications may include more, less, and/or different information than depicted without departing from the spirit or scope of the techniques describe herein. By way of example and not limitation, application indications may, in some cases, not include one or more of an application icon, a broad description, or a more detailed description. Further, application indications may include types of user input an application is capable of receiving (e.g., stylus, touch, voice, and so on), user ratings or reviews of the applications, a popularity (as determined by an amount use, number of downloads, and so forth), a software provider, and so on.

Application indications can also include some indicator that indicates a corresponding application has not been downloaded or otherwise installed at the computing device 102. In the illustrated example, application indications 210, 214, 218 include arrows 228, 230, 232, which indicate that the corresponding applications (e.g., Drawminator and PhotoApp Mix) have not been downloaded or otherwise installed on the computing device 102. Nevertheless, the arrows 228, 230, 232 may indicate that the corresponding applications are available to download and install on the computing device 102. The arrows 228, 230, 232 also indicate that the corresponding applications are capable of performing actions on the data being edited. In some implementations, the arrows 228, 230, 232 may be selectable to download and install the corresponding application to the computing device 102, e.g., by selecting an arrow the user may be taken to of an application marketplace where the corresponding application is available for download and install. By presenting applications that are not yet installed at the computing device 102, users may be exposed to new applications and/or applications about which they were previously unaware.

The discussion turns now to a context in which the popup menu 202 may be presented. Consider an example in which a user edits an item of the editable content 108 in one of the content editing applications 110. In this example, the one application may thus be considered a primary application. Further, an interface of the primary application may include the application request component 204. While editing the item of content, the user may decide that he or she wishes to perform some action on the item that is not available in the primary application, or simply that he or she wishes to see other applications that are capable of editing the item of content. Consequently, the user may select the application request component 204 from the primary application. The popup menu 202 may be displayed as a graphical user interface (GUI) component of the primary application.

The application indications 206, 208, 210, 212, 214, 216, 218, 220 of the popup menu 202 are selectable to launch a corresponding application. In accordance with the techniques described herein, a selected application is launched and the item of content that was being edited in the primary application is automatically presented for editing in the selected application. The applications listed in the popup menu 202 may be considered secondary applications, since, once selected, the user is "taken away" from the primary application and presented the item of content in a user interface of the selected secondary application.

To generate the popup menu 202, at least one of the action registry copy 112 or the published action registry 122 is used. In one or more implementations, the action registry copy 112 and the published action registry 122 utilize a schema. The schema defines the information collected about an application for inclusion in the published action registry 122. As an example, consider FIG. 3.

Figure 3:
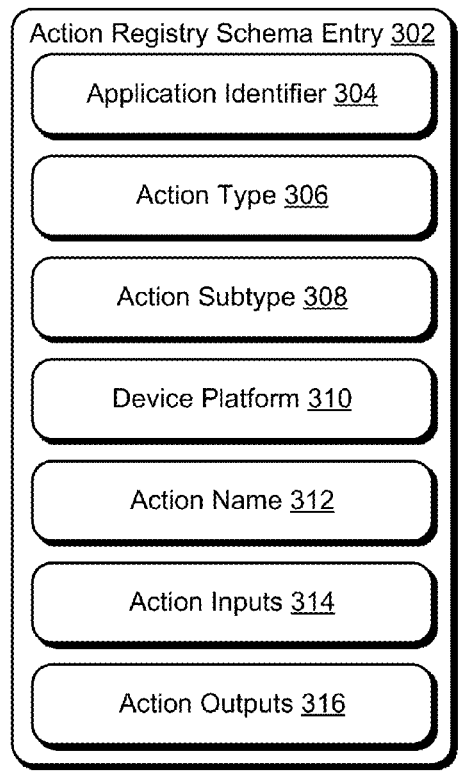
FIG. 3 is an example implementation depicting a data structure that is usable to implement a schema for an action registry.

FIG. 3 depicts an example implementation, generally at 300, of a data structure that is usable to implement a schema for an action registry. In particular, the example 300 includes action registry schema entry 302, which has application identifier 304, action type 306, action subtype 308, device platform 310, action name 312, action inputs 314, and action outputs 316.

The action registry schema entry 302 may be provided to the action registry for each action that an application is capable of performing. For example, if an application is to be registered for cropping an image, filtering an image, and blurring an image, then an action registry schema entry 302 is provided for the cropping, another is provided for the filtering, and another is provided for the blurring. The action registry schema entry 302 provided for the cropping, for instance, includes the information defined by the schema to be relevant to the cropping. Similarly, the action registry schema entries 302 provided for the filtering and blurring include the information defined by the schema to be relevant to those actions. With the information of the action registry schema entry 302, the action registry copy 112 and the published action registry 122 can make applications available for matching, e.g., to match an application to a data type being edited.

The application identifier 304 identifies an application corresponding to the action registry schema entry 302. For instance, the application identifier 304 may be a name of the application (e.g., 'Artsy Draw'), a random global unique identifier (GUID) associated with the application, or some other mechanism to uniquely distinguish the application from other applications.

The action type 306 identifies an action performable by the identified application and to which the action registry schema entry 302 corresponds. The action type 306 may correspond to a name of the action (e.g., 'filtering', 'cropping', 'blurring'), a numeric-identifier associated with the action (e.g., '1' for filtering, '2' for cropping, '3' for blurring), and so on. The published action registry 122 may utilize an identification system that predefines identifiers for different action types. Thus, an application developer who wishes to make an application available through the published action registry 122 must specify the action type using one of the predefined identifiers.

In a similar manner, the action subtype 308 identifies an even more specific type of the action corresponding to the action registry schema entry 302. The action subtype 308 may be used to further define the action type 306, for instance. By way of example, the action type 306 may identify the relevant action as filtering. The action subtype 308 may identify a type of filter, e.g., black and white, warming, cooling, etc. Like the action type 306, the action subtype 308 may correspond to a name of the subtype, a numeric identifier associated with the subtype, and so forth. Further, an identification system may be utilized that predefines identifiers for different action subtypes. In one or more implementations, the action subtype 308 is an optional field that application providers may leave blank or exclude when providing the action registry schema entry 302 for an action.

The device platform 310 identifies one or more device platforms that support the corresponding action. The device platform 310 may identify an operating system, a mobile device manufacturer, a combination of operating system and mobile device manufacturer, and so on. Broadly speaking, the device platform 310 identifies a computing configuration with which the identified application can be used to perform the identified action.

The action name 312 identifies a name of the action. It may correspond to an application- or developer-specific name of the action. In one or more implementations, the action name 312 may be a text string associated with a numeric-based identifier of the action type 306, or it may be a name to use when displaying the capabilities of the identified application. Further still, in one or more implementations where the action type 306 can be used to identify a name of the action, the action name 312 may be an optional field that can be left blank or excluded.

The action inputs 314 identify one or more data items that the identified application utilizes to perform the identified action. The action inputs 314 may correspond to media types accepted by the indicated application, for instance. Accordingly, the action inputs 314 may indicate that when the identified application is to perform the identified action on a data item, it expects to receive the data item as one of the media types indicated by the action inputs 314. In contrast, the action outputs 316 identify one or more data items that the identified application returns once the identified action has been performed. For instance, the action outputs 316 may correspond to media types that the identified application is configured to output. In one or more implementations, the action outputs 316 may match the action inputs 314.

However, in other implementations, there may be more or fewer media types represented by the action outputs 316 than the action inputs 314. There may be more media types represented by the action outputs 316, for instance, when the identified application is configured to convert received data into a variety of different formats.

The action inputs 314 and the action outputs 316 allow applications to be matched for editing data. Consider an example in which, an image is being edited by a primary application. Responsive to a request to be shown a list of image editing applications, the primary application can query the published action registry 122 or the action registry copy 112 for applications capable of editing images. To find applications capable of editing images, the action inputs 314 are considered. If the action inputs 314 for an application indicate that it is capable of performing actions on images (e.g., the action inputs 314 include image types such as JPEG, BMP, PNG, and so on), then the application may be considered a match. One or more of the matches found in the published action registry 122 or the action registry copy 112 may then be presented to the user in the popup menu 202.

The action registry schema entry 302 may include different information than depicted in the example 300 without departing from the spirit or scope of the techniques described herein. Moreover, the action registry schema entry 302 may be configured in a variety of different electronic formats that enable applications to be registered with the published action registry 122. For instance, a comma separated value (CSV) file may be used to provide the registration information. Alternately or in addition, an application provider may be presented with an electronic form when registering. The electronic form may allow the appropriate information to be entered through electronic form components, such as drop down selections, text entry fields, radio buttons, and so forth. Once the information is entered, it may be processed and assembled into a data structure corresponding to the action registry schema entry 302, usable to register the application with the published action registry 122.

Consider the following example pseudocode that may be used to implement a schema for an action registry as described above:

```
action-registry-schema:[action, ...]
action:{
  id-property,
  "application-id" : STRING, ; matches a registered application
  "type" : STRING, ; e.g., edit, embed, capture
  "subtype" : STRING,
  "platform" : STRING, ; e.g., ios, android, windows
  "name" : localized-string
  "inputs" : [input, ...],
  "outputs" : [outputs, ...],
  "_links" : per JSON HAL, defined relation type is "icon"
}
localized-string: \{<locale>: STRING, ...\}
input: {
    name: STRING,
    types: [STRING, ...]; accepted media types
}
output: {
    name: STRING,
    types: [STRING, ...]; list of media types
}
```

Consider now a discussion of how data is transferred between primary and secondary applications to enable a seamless content-editing experience, in accordance with one or more embodiments. Once a secondary application is selected, the primary application and the secondary application may communicate using messages formatted according to the principles described herein. As an example, consider FIG. 4.

Figure 4:
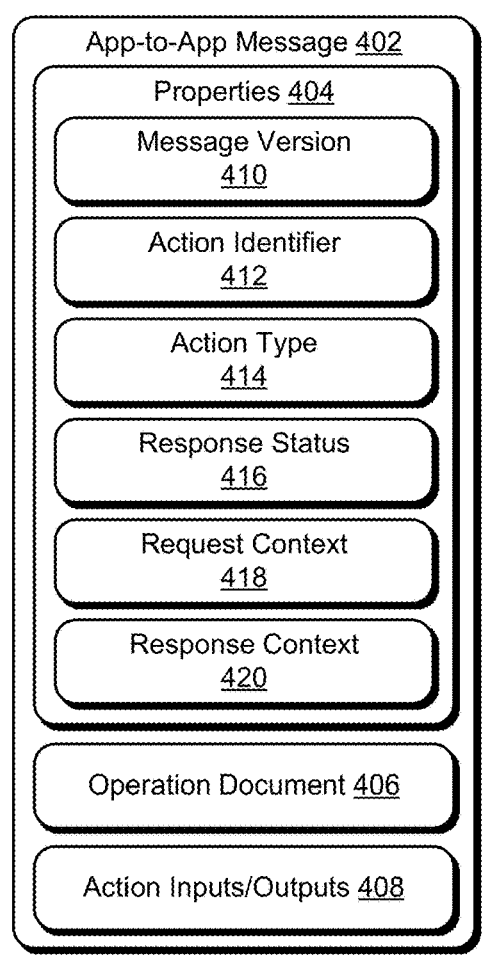
FIG. 4 is an example implementation depicting a message that is configurable by applications matched using the action registry and enables data editing between the applications.

FIG. 4 depicts an example implementation, generally at 400, of a message that is configurable by applications matched using the action registry to enable data editing within the applications. In particular, FIG. 4 illustrates app-to-app message 402 (A2A message 402). The A2A message 402 may be sent from a primary application to a secondary application, for example, when the secondary application is launched responsive to a selection from the popup menu 202. The A2A message 402 may also be sent from the secondary application to the primary application when a user has finished editing the data with the secondary application and selects to return to the primary application.

In one or more implementations, the A2A message 402 includes information that represents properties 404, operation document 406, and action input/outputs 408. The properties 404 define parameters that enable applications to parse the A2A message 402 and utilize its contents. The properties 404 may include message version 410, action identifier 412, action type 414, response status 416, request context 418, and response context 420. As used herein, a message sent from a primary application to a secondary application is referred to as a "request". This is because the primary application "requests" to use the secondary application to perform an editing action on data. In contrast, a message sent from the secondary application to the primary application is referred to herein as a "response". This is because the secondary application's edits to the data and return of the edited data "responds" to the request. Some of the properties 404 may be used with messages configured as requests but not messages configured as responses. Similarly, some of the properties 404 may be used with messages configured as responses but not messages configured as requests. Further, some of the properties 404 may be given different values depending on whether the A2A message 402 is a request or a response.

The message version 410 represents data to identify a version of the app-to-app messaging protocol being used. The message version 410 may enable a receiving application to decipher the information contained in the A2A message 402 according to the corresponding messaging protocol. Some applications may support different message versions, for example, different platforms may use different message versions that include properties or other information specific to the particular platform.

The action identifier 412 represents data to identify an action performed on the data being edited. In a request, for instance, the action identifier 412 may indicate the action the user selected to perform with the secondary application. A user may select a secondary application for filtering an image, for example. Accordingly, the action identifier 412 indicates that the action for which the secondary application is invoked is filtering. Thus, when the secondary application is launched, it may be launched directly into an interface that supports the action identified by the action identifier 412. In a response, the action identifier 412 may indicate the action that was performed on the data being returned from the secondary application. Continuing with the above example in which the secondary application is invoked to filter an image, the action identifier 412 of a corresponding response can also indicate that the action performed on the data was filtering. In one or more implementations, the action identifier 412 corresponds to a universally unique identifier (UUID) for an invoked action, and is used for both requests and responses.

The action type 414 represents data to identify a type of action performed on the data being edited. In general, the action type 414 corresponds to a predefined type of action supported by the published action registry 122. Action types may be associated with a number of inputs, options, outputs, and results associated with an action. Although a primary application may not have a priori knowledge of a particular secondary application, in order to invoke an action, both the primary and secondary applications must both be aware of the action type. Actions form the basis of an agreement between the primary and secondary applications so that the applications can interoperate.

The response status 416 represents data that is pertinent to a message configured as a response. The response status 416 can include information that indicates a code and a reason for the response. For example, the response status 416 can indicate that a user has chosen to cancel the actions that are performable in the secondary application and simply return to the primary application. The response status 416 can also indicate that the user has chosen to save the data being edited and stay in the secondary application, or return to the primary application after saving. Further still, the response status 416 can indicate that the user has chosen not to save changes made in the secondary application and chosen to continue working in the secondary application. The response status 416 may be configured to represent other information pertinent to a response without departing from the spirit or scope of the techniques described herein.

The request context 418 represents data to indicate that the A2A message 402 is configured as a request. The request context 418 can also specify information pertinent to the request such as an expected behavior of the secondary application, e.g., once edits are made to the data the primary application expects context to return. The request context 418 can be used to specify other information pertinent to the context in which the secondary application is launched to further edit the data.

The response context 420 represents data to indicate the A2A message 402 is configured as a response. The response context 420 can also specify information pertinent to the response such as a behavior requested by a corresponding request, e.g., once the edits are made to the data the user is to be returned to the primary application. The response context 420 can be used to specify other information pertinent to the context in which the user is returned after editing the data in the secondary application.

Consider the following example pseudocode to define a syntax for implementing the properties 404 of the A2A message 402:

```
A2A#message: {
  'message-version' : NUMBER ; e.g., 1 for the first version
  'action-id' : STRING ; UUID for an invoked action (request and response)
  'action-type' : STRING ; an action type supported by the action registry
  'status' : {
     'code': STRING,
     'reason': STRING
  },
  'request-context' : context-object ;
  'response-context' : context-object ; solely for responses
}
```

Consider now a discussion of the operation document 406. The operation document 406 is configured to define an operation of the A2A message 402, and inputs and outputs that are to be provided for the A2A message 402. The operation document 406 may specify one or more input documents for a request. For a response though, the operation document 406 may specify one or more output documents, and information to describe results of an action on the data being edited. In one or more implementations, the operation document 406 is formatted as a JavaScript Object Notation (JSON) document. It should be appreciated that the operation document 406 may be formatted in other ways without departing from the spirit or scope of the techniques described herein.

Inputs to and outputs from actions correspond to individual resources, such as individual files or composite structures. These resources are embedded in the A2A message 402 and are referenced by a path in the operation document 406. Consider an example in which a secondary application is invoked for filtering an image. The input for filtering in the secondary application may correspond to an image. Thus, the request sent to the secondary application may include the image, which is referenced by a path in the operation document 406. As a result of performing the filtering action, the secondary application may generate additional data, such as an image filter. The image filter may be combined with the original image to form a composite structure. Consequently, the output of the secondary application may correspond to the composite structure comprised of the image and the image filter. Thus, the response sent back to the primary application may include the composite structure, which is referenced by a path in the operation document 406.

The action inputs/outputs 408 are configured to define the inputs and outputs for requests and responses. When the A2A message 402 is configured as a request, it may include zero or more inputs. When the A2A message 402 is configured as a response, in may include zero or more outputs. A number of inputs and outputs depends on a type of action invoked. The type or types of inputs and outputs also depends on a type of action invoked. For example, an action to crop an image may correspond to a different number and type of inputs than rotating a text box. The action inputs/outputs 408 included in the A2A message 402 are those referenced by paths in the operation document 406.

In general, an A2A message 402 configured as a request is generated when the primary application receives input from a user to select a secondary application from the popup menu 202. The primary application may employ the application match module 114 to generate the request-configured A2A message 402. Once generated, the primary application sends the A2A message 402 to the selected secondary application, e.g., using a one-way data transfer mechanism built into an operating system of the computing device 102. As mentioned above, the request-configured A2A message 402 includes the data to be shared with the secondary application and information about the action that is to be performed on the data.

The secondary application is then invoked to perform the requested action on the data. For example, the secondary application is launched in a mode that supports the requested action, e.g., the data is presented via an interface of the secondary application that supports the requested action. Once the user has performed the requested action on the data, the user is presented with the option of returning the newly edited data to the primary application or simply canceling the action. In both cases, the user is automatically returned to the primary application. If the user has selected to keep the changes, the data is seamlessly updated. After returning to the primary application, the user can initiate another editing application using a selected secondary application.

Figure 5:
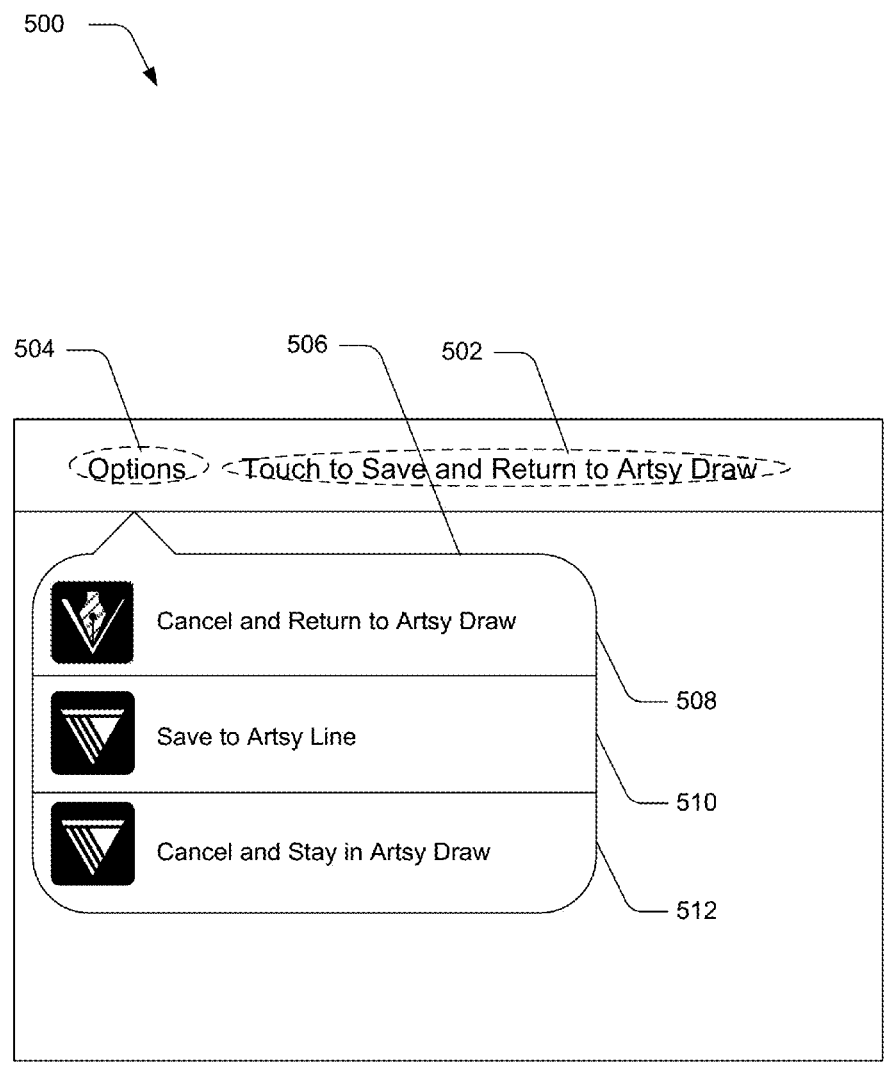
FIG. 5 is an example implementation depicting a user interface presented within a secondary application that is launched from a primary application to further edit data.

With regard to options presented to a user once the requested action is performed, consider FIG. 5. FIG. 5 depicts an example implementation, generally at 500, of a user interface that is presented within a secondary application launched to further edit data from a primary content-editing application. The example implementation 500 includes save and return mechanism 502 and other options mechanism 504, which is selectable to present other options popup 506. The save and return mechanism 502 represents functionality to save changes made in a secondary application (e.g., changes made by performing the requested action) and return to the primary application. In the illustrated example, the primary application is 'Artsy Draw' and the secondary application is 'Artsy Line'. Thus, the example implementation 500 illustrates a user interface that may be presented while a user is interacting with 'Artsy Line'.

The other options popup 506 includes other option indications 508, 510, 512. These indicate options other than to save the changes made in the secondary application and automatically return to the primary application. The other option indication 508, for instance, indicates to cancel the changes made in the secondary application (e.g., Artsy Line) and return to the primary application (e.g., Artsy Draw). The other option indication 510 indicates to save the changes and stay in the secondary application. Finally, the other option indication 512 indicates to cancel the changes and stay in the secondary application. The other option indications 508, 510, 512 are selectable from the other options popup 506 to initiate the indicated operation. Responsive to a selection, an A2A message 402 is returned to the primary application. The returned message is configured as a response and includes information indicative of the selected option.

Figure 6:
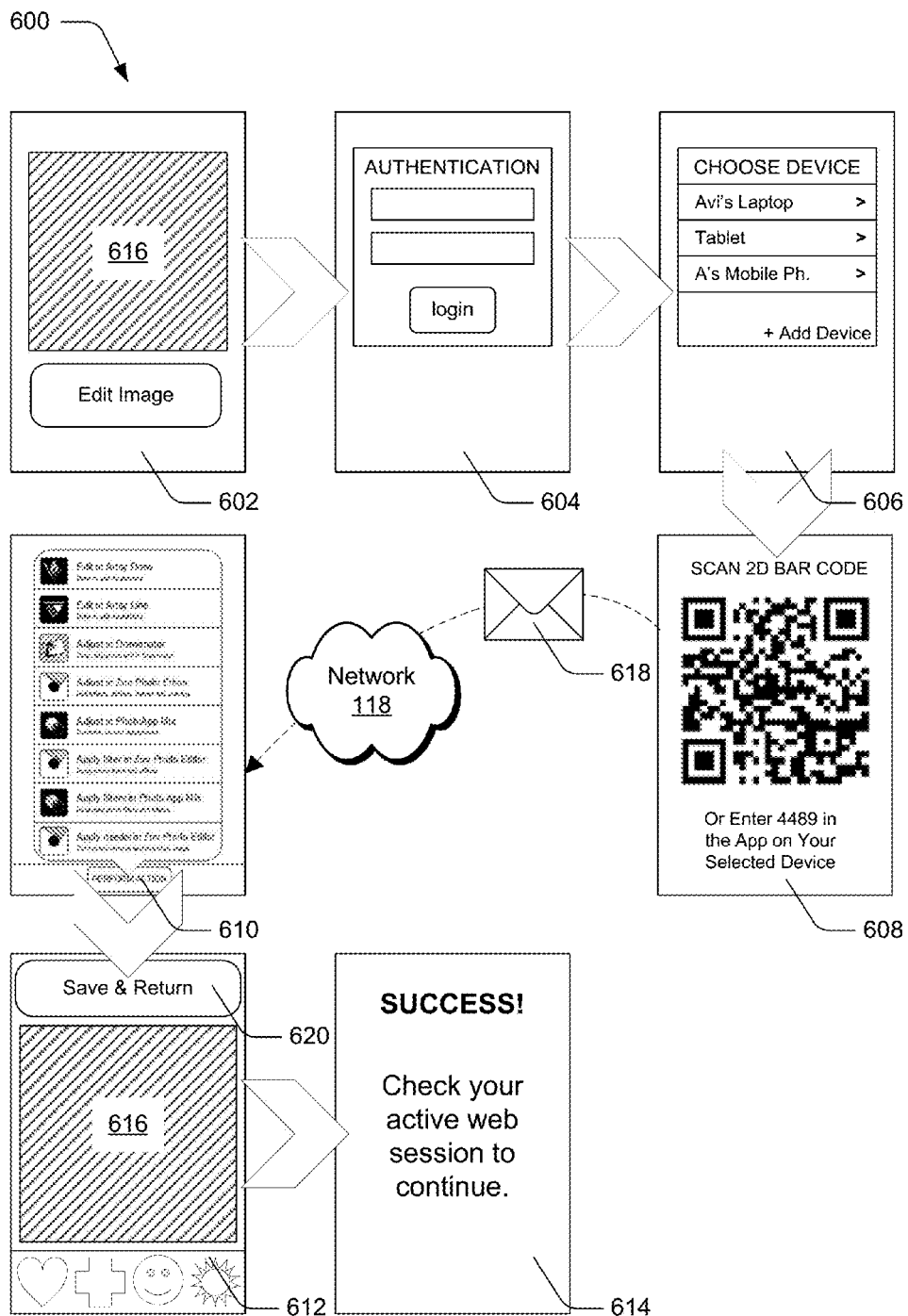
FIG. 6 is an example implementation depicting a scenario in which the action registry is used to match applications to edit data that has been transferred between devices of a user.
Figure 7:
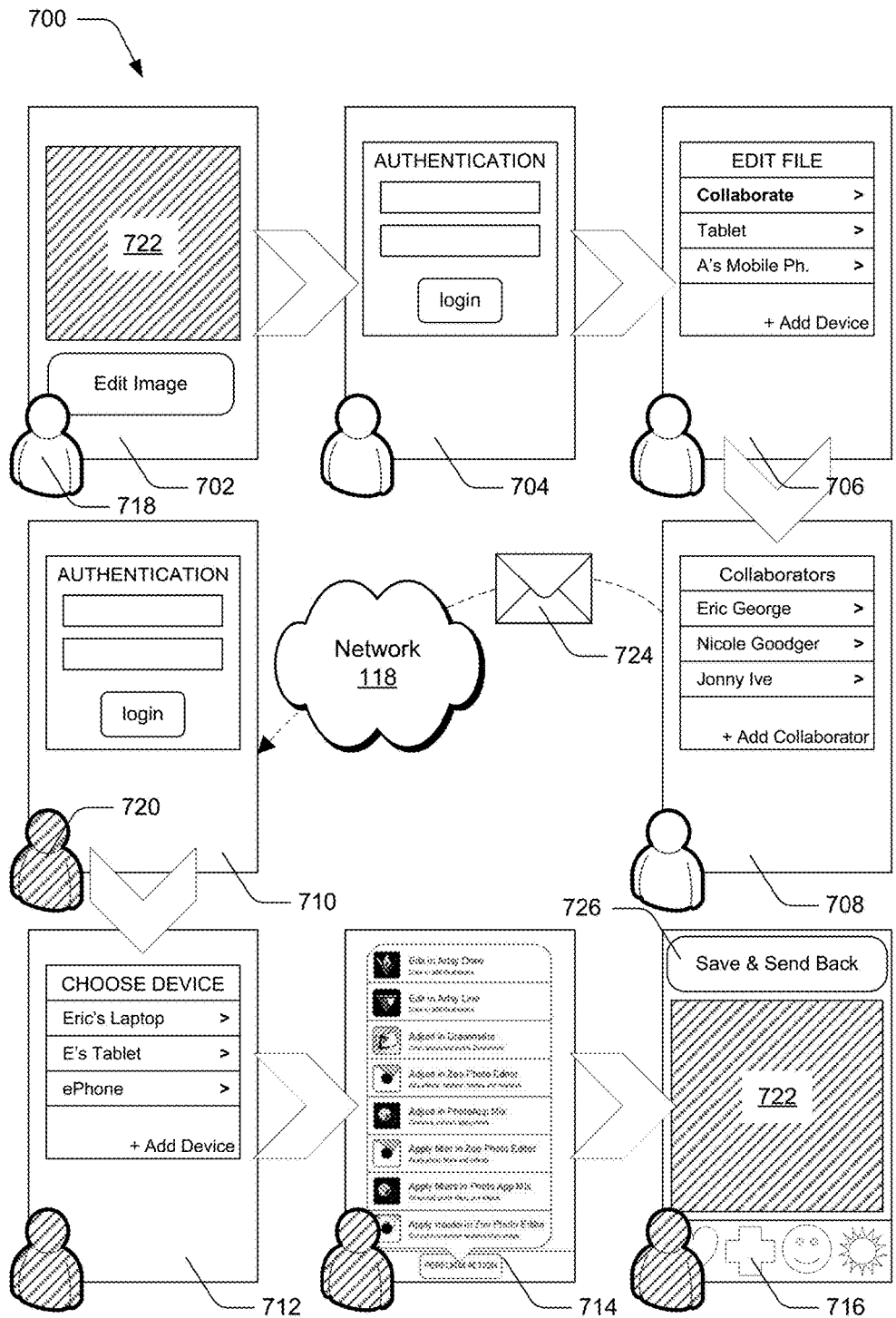
FIG. 7 is an example implementation depicting a scenario in which the action registry is used to match applications to edit data that has been transferred from one user to another for editing by the other user.

FIGS. 6 and 7 illustrate additional scenarios in which an action registry can be used to facilitate data editing in manners that extends beyond simply using a primary application to edit the data. FIG. 6 depicts an example scenario, generally at 600, in which the action registry is used to facilitate multi-application data editing across different devices. The scenario 600 is represented using graphical user interface (GUI) 602, 604, 606, 608, 610, 612, 614. These GUIs may be displayed on suitably configured computing devices associated with a user, such as the computing device 102. By way of example, GUI 602, 604, 606, 608, may be displayed on the computing device 102 while GUI 610, 612, 614 are displayed on a different computing device associated with the user, such as a mobile phone, a desktop computer, a laptop computer, and so forth.

The GUI 602 represents a portion of the scenario 600 in which the user edits data on a first computing device using a primary application. In this particular example, the data being edited is image 616. While being presented with the GUI 602, the user may select an option to edit the image 616 on a different device. Responsive to selection of such an option the GUI 604 may be displayed at the first computing device. The GUI 604 represents that the user logs into a user account that includes a list of devices associated with the user. In the particular example, the GUI 604 prompts the user for a username and password. It should be appreciated that other authentication techniques may be utilized, however, such as biometrics (e.g., the user may be prompted to scan a fingerprint, speak a passphrase, and so on), input of an account-specific unlocking gesture, and so forth.

Once authenticated, the user can be presented with a list of devices that are associated with the user, as in GUI 606. The listed devices may be selectable to transfer the image 616 to the selected device, where the image 616 can be edited using a different application than was used to edit the image 616 at the first device. In the scenario 600, the user selects one of the devices listed in the GUI 606, e.g., a second device. Responsive to the selection, a transfer process is initiated to transfer the data being edited (e.g., the image 616) to the second device and to launch an application for further editing.

The GUI 608 represents one example of how the transfer of data and application launch can be initiated. In particular, the GUI 608 includes a bar code which can be scanned by the second device, e.g., using a camera of the second device. From the scanned barcode, information is extracted that enables the second device to receive the image 616 from the first device. In one or more implementations, the information extracted from the barcode is content transfer information that enables communication with the first device to obtain the image 616. The second device can use the extracted information to initiate communication with the first device to obtain the image 616. The information extracted from the barcode can also enable display of the GUI 610, which includes a popup menu configured as in FIG. 2. Additionally, the GUI 608 includes information for initiating the transfer of data and application launch in another manner In particular, the GUI 608 includes a code (e.g., '4489') that can be entered into an interface of the selected device (not shown) to initiate transfer of the data and launch of the application.

The illustrated scenario 600 also includes message 618, which may be configured according to the A2A message 402 depicted in FIG. 4. The message 618 can be configured to include the image 616, and information indicating that the types of actions to be performed are those associated with images. In the illustrated scenario 600, the message 618 is communicated over the network 118 from the first computing device to the second device. The second device parses the message 618 and determines that the data to be edited is the image 616.

Based on this and other information included in the message 618, the second device can query the published action registry 122 or a local copy of the published action registry to find applications that can perform actions on images. The published action registry 122 may return a list of applications to the second device that are capable of performing actions on images. Some of the returned applications can be presented to the user of the second device in the form of a list, as in the GUI 610. The applications presented may not include each of those returned, since there may be too many applications returned to fit on a display of the second device. The applications presented may be those determined most pertinent to the user, most pertinent to the editing being performed on the image 616, and so on. A determination as to which applications are presented may be made based on the applications that are already installed on the second device, a popularity of the applications, ratings of the applications, whether an application developer has paid to have their application presented as part of the list, and so on. In any case, the presented list includes indications of the different applications which are selectable to launch corresponding applications and edit the image 616.

Responsive to selection of an indication from the list, the selected application is launched. The GUI 612 represents the launched application. In particular, the selected application is launched into a mode that enables the image 616 to be edited. This is depicted by inclusion of the image 616 in the GUI 612. The user may thus edit the image 616 using editing capabilities of the selected application. The GUI 612 also includes response button 620, which is illustrated with the phrase 'Save & Return'. Accordingly, the depicted response button 620 represents functionality to save changes made to the image 616 at the second device and using the selected application. The depicted response button 620 also represents functionality to return the changed image to the first device (e.g., the computing device 102). To do so, the second device may communicate a response message back over the network 118 to the first device that includes the changed image (not shown). The first device can then automatically present the changed image via the application initially used to edit the image, e.g., via the GUI 602. The GUI 614 indicates that the save and return operation was successfully performed. The GUI 614 may be presented at the second device, for instance, to indicate that the user can return to the first device to make even further edits to the changed image.

FIG. 7 depicts an example scenario, generally at 700, in which the action registry is used to facilitate multi-application data editing for different users. The scenario 700 is represented using GUI 702, 704, 706, 708, 710, 712, 714, 716. The scenario also includes users 718, 720, which are represented with the white, unfilled user illustration and the diagonally striped user illustration, respectively. In particular, the users 718, 720 are depicted along with the GUIs they interact with, and which correspond to different portions of the scenario 700. The GUIs may be displayed on suitably configured devices associated with the users 718, 720, such as the computing device 102. By way of example, the computing device 102 may be associated with the user 718, and GUI 702, 704, 706, 708 displayed on the computing device 102. A different computing device may be associated with the user 720, and GUI 710, 712, 714, 716 displayed on the different computing device.

The GUI 702 represents a portion of the scenario 700 in which the user 718 edits data on a first computing device using a primary application. In this particular example, the data being edited is image 722. While being presented with the GUI 702, the user 718 may select an option to collaborate with the user 720 to edit the image 722. In the scenario 700, collaboration involves sending the image 722 to the user 720 for editing. Responsive to selection of such an option, the GUI 704 may be displayed to the user 718 at the first computing device. The GUI 704 represents that the user 718 logs into a user account and is presented with a list of options that include a collaboration option and options to edit the image 722 using other devices associated with the user 718. The option to collaborate may be selectable via the GUI 706 to display GUI 708. The GUI 708 includes a list of users with which the user 718 may collaborate. Via the GUI 708, the user 718 may select one of the listed users, such as 'Eric George'. Thus, the user 720 may correspond to Eric George. Indeed, in the GUI 712 the devices listed are associated with Eric, e.g., 'Eric's Laptop', 'E's Tablet', and 'ePhone'.

Regardless of which user is selected, a transfer process is initiated to transfer the data being edited by the user 718 (e.g., the image 722) to the user 720. The transfer process may also involve launching an application to further edit the image 722. As part of the transfer process, message 724 is communicated over the network 118 from the first device of the user 718 to the second device of the user 720. The message 724 may be configured according to the A2A message 402 depicted in FIG. 4. In the context of the scenario 700, the message 724 can be configured to include the image 722, and information indicating that the types of actions to be performed are those associated with images. The second device receives the message 724, parses the message 724, and continues the transfer process so that the user 720 can edit the image.

The GUI 710 represents authentication of the user 720. In particular, the GUI 710 represents that the user 720 logs into a corresponding user account that includes a list of devices associated with the user 720. Once authenticated, the user 720 can be presented with a list of devices that are associated with the user 720, as in the GUI 712. From here, the user 720 can select the device he or she is utilizing to edit the image 722 or the user 720 can select a different device to edit the image. Responsive to the selection, the user 720 can be presented via the selected device with a list of applications that are capable of performing actions on images.

To do so, the second device of the user 720 parses the message 724 and determines that the data to be edited is the image 722. Based on this and other information included in the message 724, the second device can query the published action registry 122 or a local copy of the published action registry to find applications that can perform actions on images. The published action registry 122 may return a list of applications to the second device that are capable of performing actions on images. Some of the returned applications can be presented to the user of the second device in the form of a list, as in the GUI 714. The presented list includes indications of the different applications, which are selectable by the user 720 to launch corresponding applications and edit the image 722.

Responsive to selection of an indication from the list, the selected application is launched. The GUI 716 represents the launched application. In particular, the selected application is launched into a mode that enables the image 722 to be edited by the user 720. This is depicted by inclusion of the image 722 in the GUI 716. The user 720 may thus edit the image 722 using editing capabilities of the selected application. The GUI 716 also includes response button 726, which is illustrated with the phrase 'Save & Send Back'. Accordingly, the depicted response button 726 represents functionality to save changes made by the user 720 to the image 722 using the selected application. The depicted response button 726 also represents functionality to return the changed image to the user 718. To do so, the user 720's device may communicate a response message includes the changed image back over the network 118 to an account of the user 718 (not shown). The device associated with the user 718 can then automatically present the changed image in the application that the user 718 initially used to edit the image, e.g., via the GUI 702.

Having discussed example details of the techniques for using an action registry to edit data across users and devices, consider now some example procedures to illustrate additional aspects of the techniques.

Example Procedures

This section describes example procedures for using an action registry to edit data across users and devices in one or more implementations. Aspects of the procedures may be implemented in hardware, firmware, or software, or a combination thereof. The procedures are shown as a set of blocks that specify operations performed by one or more devices and are not necessarily limited to the orders shown for performing the operations by the respective blocks. In at least some implementations the procedures are performed by a suitably configured device, such as the example computing device 102 of FIG. 1 that makes use of an application match module 114.

Figure 8:
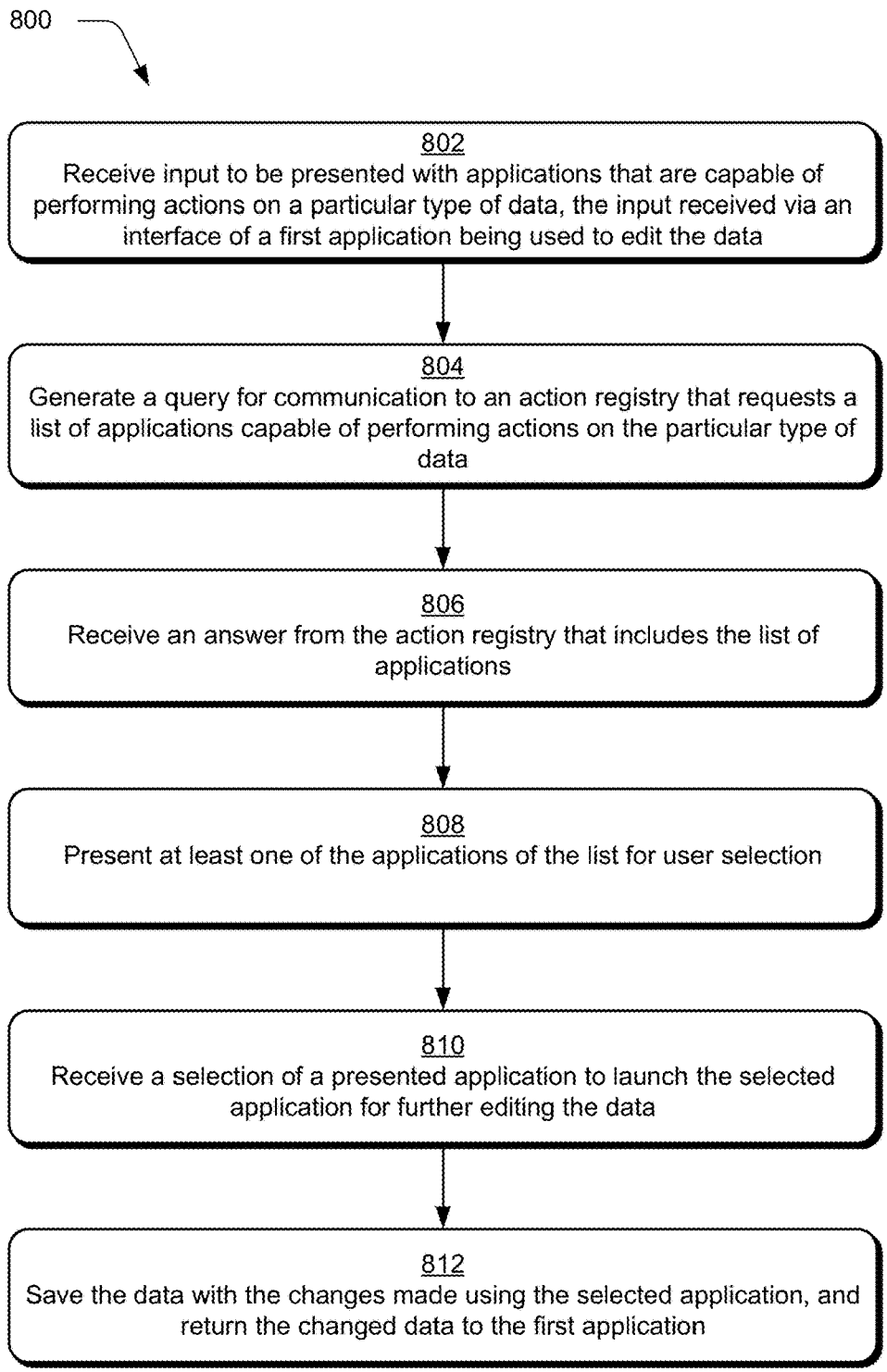
FIG. 8 is a flow diagram depicting a procedure in an example implementation in which an action registry is used to match applications for editing data.

FIG. 8 depicts an example procedure 800 in which an action registry is used to match applications for editing data. Input is received to present a user with applications capable of performing actions on a particular type of data (block 802). In accordance with the principles described herein, the input is received via an interface of a first application being used to edit the data. For example, a user editing an item of the editable content 108 with one of the content editing applications 110 may select an option of this first application to display a list of other applications capable of editing the item of content.

A query requesting a list of the applications from an action registry is generated for communication (block 804). In accordance with one or more principles described herein, the action registry is configured to maintain information describing actions that applications are capable of performing on different types of data. For example, the application match module 114 may be incorporated as part of the application being used to edit the content. The application match module 114 generates a query that requests a list of applications from the published action registry 122. In particular, the query requests applications from the published action registry 122 that are capable of performing actions on the type of data being edited. The published action registry 122 maintains information that can be searched to discover registered applications capable of performing actions on the given type of data. For example, the published action registry 122 can be searched to find applications that are capable of performing actions on images.

An answer is received from the action registry that includes the list of applications capable of performing actions on the type of data (block 806). For example, the application match module 114 receives a response to the query of block 804. The response includes the list of applications. At least one of the applications is presented for user selection (block 808). For example, one or more of the applications included in the answer are presented via the popup menu 202. In particular, indications of the applications are presented via the popup menu 202, and are selectable to launch the corresponding application to edit the data.

Selection of a presented application is received to launch the selected application for further editing the data (block 810). For example, a user selection of one of the application indications 206, 208, 210, 212, 214, 216, 218 is received to launch the corresponding application. The selected application is launched to further edit the data. For instance, when the selected application is launched, it presents the data via an interface that allows the user to further edit the data.

Changes made to the data using the selected action are saved, and the changed data is returned to the first application (block 812). For example, the user edits the data using the selected application, making one or more changes to the data, e.g., the user applies a filter to an image with the selected and launched application. These changes are saved. The changed data is then returned to the first application, e.g., the image with the filter applied is communicated back to the first application. The return of the changed data enables the first application to present the changed data for editing. In this way, the user may be seamlessly returned to the first application to further edit the changed data.

Figure 9:
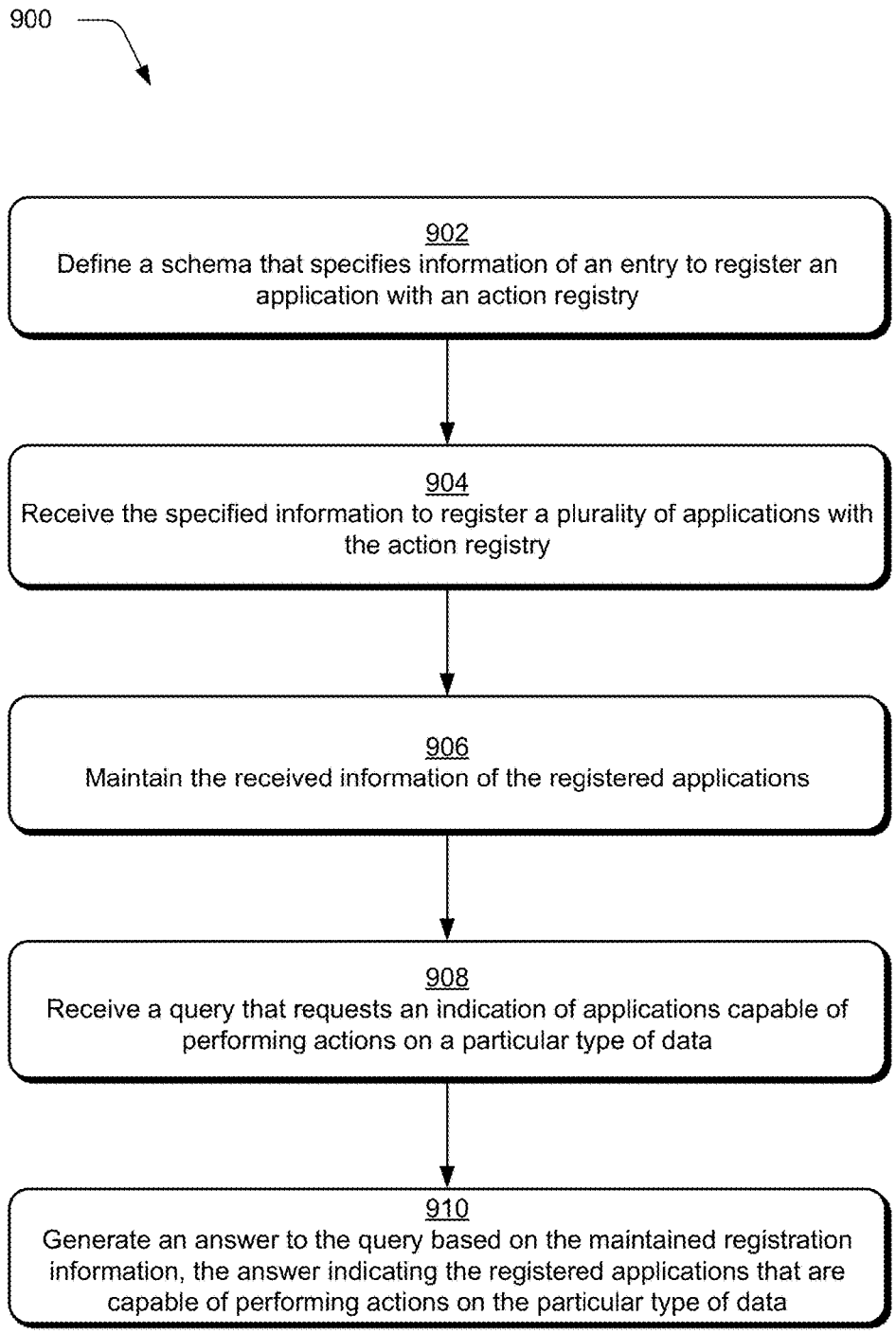
FIG. 9 is a flow diagram depicting a procedure in another example implementation in which applications are registered with an action registry and made discoverable through the action registry.

FIG. 9 depicts an example procedure 900 in which applications are registered with an action registry and made discoverable through the action registry.

A schema is defined that specifies information for an entry to register an application with an action registry (block 902). For example, a schema that specifies the information of the action registry schema entry 302 is defined. The specified information is received to register a plurality of applications with the application registry (block 904). For example, one or more of the content editing applications 110 are registered with the published action registry 122, e.g., because the information specified in the action registry schema entry 302 is provided to the published action registry 122 for those applications. The action registry maintains the information of the registered applications (block 906). For example, the published action registry 122 maintains the registration information using storage capabilities of the service provider 116, e.g., one or more databases.

A query is received that requests an indication of applications capable of performing actions on a particular type of data (block 908). For example, the published action registry 122 receives a query from the computing device 102 that requests an indication of applications capable of performing actions on images. In one or more implementations, a user may request applications that are capable of performing a specific type of action on the particular type of data. Based on this, a corresponding query is communicated to the published action registry 122. For example, the published action registry receives a query from the computing device 102 that requests an indication of applications that are capable of applying filters to images.

An answer to the query is generated based on the maintained registration information, and indicates registered applications that are capable of performing actions on the particular type of data (block 910). For example, an answer to the query received at block 908 is generated based on the information maintained at the published action registry 122. Continuing with the example in which the query requests applications that are capable of performing actions on images, the answer includes an indication of one or more applications that have registered with the published action registry 122 and are capable of performing actions on images. The answer is then communicated to the requesting computing device. For instance, the generated answer is communicated to the computing device 102. This answer enables an application of the computing device 102 to present a list of the returned applications, e.g., via the popup menu 202.

Thus, using an action registry, applications can be matched to data types to enable further editing of data using a matched application. Using the messaging described herein, a user can be transferred from a primary application being used to edit data to a selected matched application. The described messaging also enables the selected matched application to be launched automatically into a mode via which the data can be further edited. When finished editing the data in this matched application, the user can select to save any changes made and return to the primary application. The messaging also enables context to be returned to the primary application. When the user is returned to the primary application the data presented includes the changes made in the secondary application. In this way, the user can be seamlessly transferred from the primary application to the selected secondary application, and then back again to the primary application. Throughout this process, the data being edited can be transferred and maintain a current editing state. In so doing, the hassle of having to save the data to an intermediate storage location, such as a clipboard and the like, and then manually opening a secondary application that accesses the data from that location, is removed.

Having described example procedures in accordance with one or more implementations, consider now an example system and device that can be utilized to implement the various techniques described herein.

Example System and Device

Figure 10:
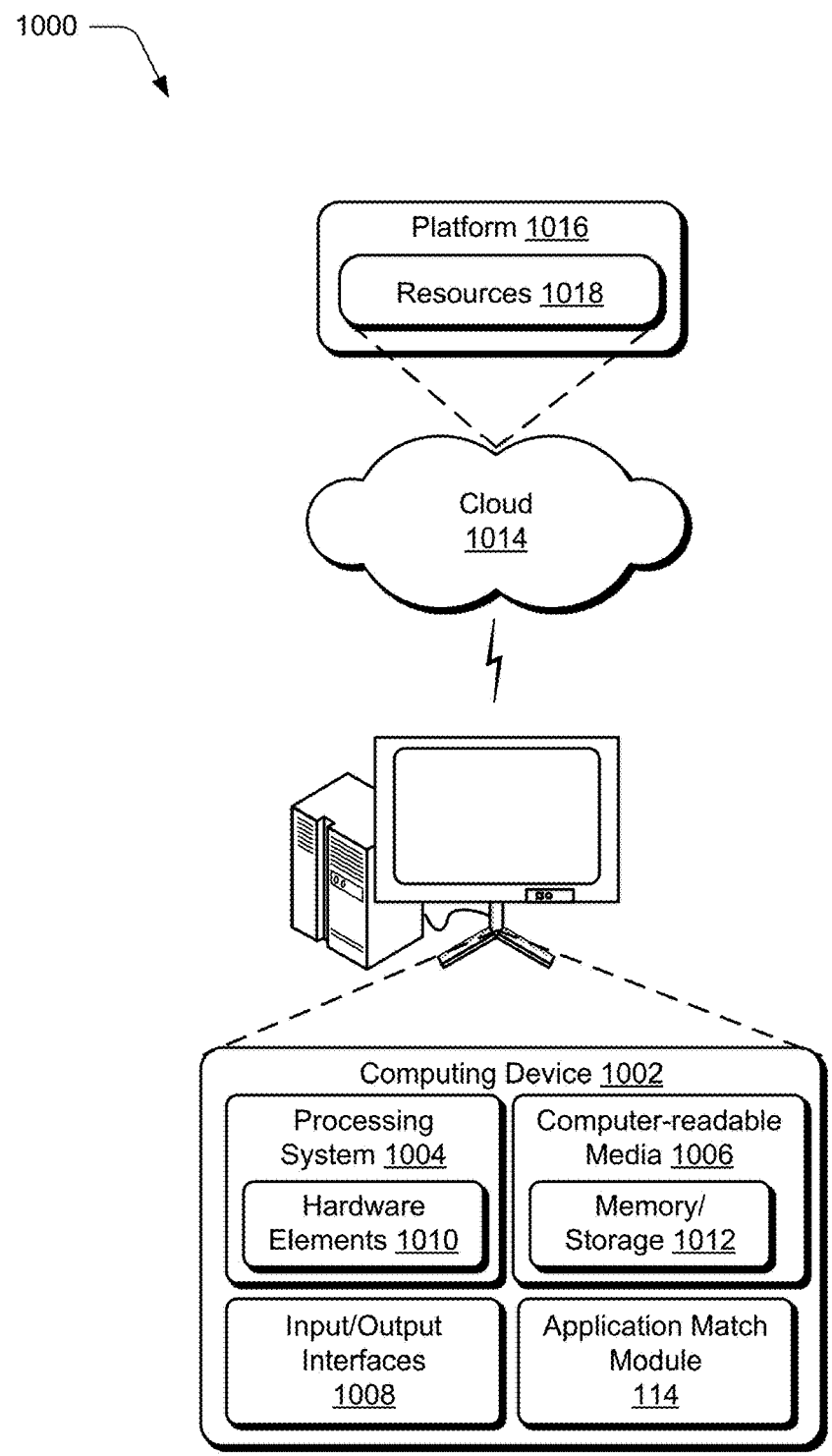
FIG. 10 illustrates an example system including various components of an example device that can be employed for one or more implementations of techniques for using an action registry to edit data across users and devices that are described herein.

FIG. 10 illustrates an example system generally at 1000 that includes an example computing device 1002 that is representative of one or more computing systems and/or devices that implement the various techniques described herein. This is illustrated through inclusion of the application match module 114, which operates as described above. The computing device 1002 may be, for example, a server of a service provider, a device associated with a client (e.g., a client device), an on-chip system, and/or any other suitable computing device or computing system.

The example computing device 1002 includes a processing system 1004, one or more computer-readable media 1006, and one or more I/O interfaces 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware elements 1010 that may be configured as processors, functional blocks, and so forth. This includes implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 1006 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An embodiment of the described modules and techniques may be stored on or transmitted across some form of computer-readable media. The computer-readable media may include a variety of media that may be accessed by the computing device 1002. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information for access by a computer.

"Computer-readable signal media" refers to a signal-bearing medium that is configured to transmit instructions to the hardware of the computing device 1002, such as via a network. Signal media typically embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that is employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules are implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software are achieved at least partially in hardware, e.g., through use of computer-readable storage media and/or hardware elements 1010 of the processing system 1004. The instructions and/or functions are executable/operable by one or more articles of manufacture (for example, one or more computing devices 1002 and/or processing systems 1004) to implement techniques, modules, and examples described herein.

The techniques described herein are supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 abstracts resources and functions to connect the computing device 1002 with other computing devices. The platform 1016 also serves to abstract scaling of resources to provide a corresponding level of scale to encountered demand for the resources 1018 that are implemented via the platform 1016. Accordingly, in an interconnected device embodiment, implementation of functionality described herein is distributed throughout the system 1000. For example, the functionality is implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by a first device to match applications for editing content that is received from a second device for cross-device editing, the method comprising:
   receiving content from the second device based on a selection made at the second device to edit the content using the first device;
   presenting, by the first device, one or more applications that are capable of editing a content type of the received content, the one or more applications ascertained from a query answer received from an action registry that maintains information indicating types of content different applications are capable of editing;
   responsive to selection of a presented application, automatically launching the selected application to enable the content received from the second device to be edited at the first device, including presenting the content via an editing interface of the selected application; and
   responsive to receiving user input to save one or more edits made to the received content using the selected application, communicating the edited content to the second device.

2. A method as described in claim 1, wherein communication of the edited content enables automatic presentation of the edited content at the second device via an editing interface of an application used to edit the content at the second device.

3. A method as described in claim 2, wherein the selection to edit the content using the first device is made via the application used to edit the content at the second device.

4. A method as described in claim 1, wherein the one or more applications that are capable of editing the content type are presented automatically responsive to receiving the content from the second device.

5. A method as described in claim 4, wherein the first device and the second device are associated with a user and the user has a corresponding user account that includes a list of associated devices, the list of associated devices being presentable to the user for selection to transfer the content to a selected device for editing.

6. A method as described in claim 5, wherein the user account is user authenticable to enable presentation of the list of associated devices.

7. A method as described in claim 1, further comprising:
   extracting content transfer information from a scanned barcode that enables communication with the second device to obtain the content; and
   initiating the communication with the second device to obtain the content via the receiving using the extracted information.

8. A method as described in claim 1, further comprising:
   receiving user input to enter content transfer information that is presented by a display of the second device, the content transfer information enabling communication with the second device to obtain the content; and
   initiating the communication with the second device to obtain the content using the extracted information.

9. A method as described in claim 1, further comprising presenting a notification that communication of the edited content to the second device is successful.

10. A method implemented to enable collaboration between users for editing content, the method comprising:
    receiving the content by a first user device associated with a first user, the content received from a second user device associated with a second user based on a selection made at the second user device to collaborate with the first user for editing the content;
    responsive to receiving the content from the second user device, presenting one or more applications at the first user device that are capable of editing a content type of the received content, the one or more applications ascertained from a query answer received from an action registry that maintains information indicating types of content different applications are capable of editing;

responsive to selection of a presented application, automatically launching the selected application to enable the received content to be edited at the first user device, including presenting the content via an editing interface of the selected application; and responsive to receiving input at the first user device to save one or more edits made to the received content using the selected application, communicating the edited content to the second user device.

11. A method as described in claim 10, wherein communication of the edited content enables automatic presentation of the edited content at the second user device via an editing interface of an application that is usable at the second user device to edit the content.

12. A method as described in claim 11, wherein the selection to collaborate with the first user is made from the application that is usable to edit the content at the second user device.

13. A method as described in claim 10, wherein the one or more applications that are capable of editing the content type are presented automatically at the first user device responsive to receiving the content from the second user device.

14. A method as described in claim 10, wherein the second user has a corresponding user account that includes a list of other users available for collaborative content editing, the list of other users being presentable at the second user device for selection to transfer the content to a device associated with a selected user for collaborative editing.

15. A method as described in claim 14, wherein the user account is authenticable to enable presentation of the list of other users.

16. A method as described in claim 10, further comprising:
   authenticating the first user to a corresponding user account that includes a list of associated devices;
   presenting the list of associated devices at the first user device to enable selection of a device on which the content is to be edited, and one of:
      transferring the content to a selected device if the selected device is different from the first user device; or
      presenting the one or more applications capable of editing the content type if the selected device corresponds to the first user device.

17. A device comprising:
one or more processors; and
memory having stored thereon computer-readable instructions that are executable by the one or more processors to perform operations for matching applications for editing content using multiple devices or by different users, the operations comprising:
   receiving content from a source device based on a selection made at the source device to edit the content using the device;
   presenting one or more applications that are capable of editing a content type of the received content, the one or more applications ascertained from a query answer received from an action registry that maintains information indicating types of content different applications are capable of editing;
   responsive to selection of a presented application, automatically launching the selected application to enable the content received from the source device to be edited at the device, including presenting the content via an editing interface of the selected application; and
   responsive to receiving user input to save one or more edits made to the received content using the selected application, communicating the edited content to the source device.

18. A device as described in claim 17, wherein communication of the edited content enables automatic presentation of the edited content at the source device via an editing interface of an application used to edit the content at the source device.

19. A device as described in claim 18, wherein the selection to edit the content using the device is made via the application used to edit the content at the source device.

20. A device as described in claim 17, wherein the one or more applications that are capable of editing the content type are presented automatically responsive to receiving the content from the source device.

* * * * *